(12) United States Patent
Swierz, III et al.

(10) Patent No.: US 10,453,043 B2
(45) Date of Patent: Oct. 22, 2019

(54) SYSTEM AND METHOD FOR ONLINE BILL PAYMENT

(75) Inventors: N. Frank Swierz, III, Saline, MI (US);
Brian D. Vroom, Ann Arbor, MI (US);
Jonathan A. Baron, Dexter, MI (US)

(73) Assignee: Thomson Reuters Global Resources Unlimited Company, Baar (CH)

(*) Notice: Subject to any disclaimer, the term of this patent is extended or adjusted under 35 U.S.C. 154(b) by 1098 days.

(21) Appl. No.: 12/215,198

(22) Filed: Jun. 25, 2008

(65) Prior Publication Data
US 2009/0327108 A1    Dec. 31, 2009

(51) Int. Cl.
| | |
|---|---|
| G06F 17/22 | (2006.01) |
| G07F 19/00 | (2006.01) |
| G07F 17/00 | (2006.01) |
| G06Q 20/14 | (2012.01) |
| G06Q 40/02 | (2012.01) |
| G06Q 40/00 | (2012.01) |
| G06Q 20/10 | (2012.01) |
| G06Q 20/20 | (2012.01) |
| G06Q 10/10 | (2012.01) |
| G06Q 30/04 | (2012.01) |

(52) U.S. Cl.
CPC ............. *G06Q 20/14* (2013.01); *G06Q 10/10* (2013.01); *G06Q 20/10* (2013.01); *G06Q 20/207* (2013.01); *G06Q 30/04* (2013.01); *G06Q 40/00* (2013.01); *G06Q 40/02* (2013.01); *G06Q 40/12* (2013.12); *G06Q 40/123* (2013.12)

(58) Field of Classification Search
CPC ........ G06Q 40/10; G06Q 40/02; G06Q 40/00; G06Q 30/04; G06Q 20/10; G06Q 40/103; G06Q 20/207; G06Q 10/10
USPC .................................................... 705/30, 31
See application file for complete search history.

(56) References Cited

U.S. PATENT DOCUMENTS

| | | | | |
|---|---|---|---|---|
| 5,745,883 | A * | 4/1998 | Krist ...................... | G03G 21/02 705/30 |
| 6,138,237 | A * | 10/2000 | Ruben .................... | G06F 21/10 713/162 |
| 6,169,979 | B1 * | 1/2001 | Johnson ................. | G06Q 30/02 705/30 |
| 6,456,724 | B1 * | 9/2002 | Watanabe ............... | 382/100 |

(Continued)

OTHER PUBLICATIONS

Developing a Paperless Mindset by Baron, Jonathan A, Accounting Technology, Sep. 2005, ABI/Inform Professional Advance, p. 5.*

(Continued)

*Primary Examiner* — Russell S Glass
(74) *Attorney, Agent, or Firm* — Duncan Galloway Egan Greenwald, PLLC; Kevin T. Duncan

(57) ABSTRACT

The present invention provides an accounting software application and related system and method for generating and presenting unfileable tax documents to clients for review and upon approval and payment converting the unfileable tax document into a final, fileable document for filing with a tax entity by either the service provider or the client. Watermarks, obscuring text, and other techniques may be employed to render draft tax documents unfileable so as to promote payment of services when presenting work product, such as tax returns, electronically to clients and confirming payment by the client prior to presenting or making accessible a fileable version of the document.

28 Claims, 11 Drawing Sheets

(56) References Cited

U.S. PATENT DOCUMENTS

| | | | |
|---|---|---|---|
| 6,567,789 B1* | 5/2003 | Baker | G06Q 10/10 705/30 |
| 6,629,081 B1* | 9/2003 | Cornelius | G06Q 20/04 705/30 |
| 6,807,533 B1* | 10/2004 | Land | G06Q 40/12 705/30 |
| 6,879,965 B2 | 4/2005 | Fung et al. | |
| 6,993,502 B1* | 1/2006 | Gryglewicz | G06Q 20/207 705/19 |
| 7,103,577 B2 | 9/2006 | Blair et al. | |
| 7,107,239 B2* | 9/2006 | Graff | G06Q 30/06 705/31 |
| 7,107,249 B2 | 9/2006 | Dively et al. | |
| 7,117,171 B1 | 10/2006 | Pollin | |
| 7,158,955 B2 | 1/2007 | Diveley et al. | |
| 7,165,052 B2 | 1/2007 | Diveley et al. | |
| 7,184,989 B2 | 2/2007 | Hansen et al. | |
| 7,191,151 B1 | 3/2007 | Nosek | |
| 7,194,431 B1* | 3/2007 | Land | G06Q 10/087 705/28 |
| 7,200,576 B2 | 4/2007 | Steeves et al. | |
| 7,213,003 B1 | 5/2007 | Kight et al. | |
| 7,222,098 B2* | 5/2007 | Silverbrook | G06Q 20/10 705/23 |
| 7,234,103 B1* | 6/2007 | Regan | G06Q 10/00 705/19 |
| 7,240,031 B1 | 7/2007 | Kight et al. | |
| 7,245,294 B2* | 7/2007 | Lapstun | G06F 3/0317 345/179 |
| 7,353,203 B1 | 4/2008 | Kriplani et al. | |
| 7,363,579 B2* | 4/2008 | Vasey | G06F 17/218 715/256 |
| 7,395,241 B1 | 7/2008 | Cook et al. | |
| 7,574,386 B2* | 8/2009 | Hahn-Carlson | G06Q 20/20 705/30 |
| 7,603,301 B1* | 10/2009 | Regan | G06Q 10/10 705/30 |
| 7,668,763 B1* | 2/2010 | Albrecht | G06Q 40/02 705/30 |
| 7,769,645 B1* | 8/2010 | Albrecht | G06Q 40/02 705/30 |
| 7,805,343 B1* | 9/2010 | Lyons | G06Q 10/00 705/31 |
| 7,853,494 B2* | 12/2010 | Wyle | G06F 17/243 705/19 |
| 8,271,355 B2* | 9/2012 | Johnson | G06Q 10/06 705/26.81 |
| 8,544,726 B1* | 10/2013 | Hahn | G06Q 10/10 235/376 |
| 8,627,939 B1* | 1/2014 | Jones | G07F 19/20 194/207 |
| 2002/0101626 A1* | 8/2002 | Pandipati | G06Q 40/00 358/505 |
| 2002/0178117 A1* | 11/2002 | Maguire | G06Q 30/04 705/40 |
| 2003/0023528 A1* | 1/2003 | Wilce | G06F 17/24 705/35 |
| 2003/0028477 A1* | 2/2003 | Stevenson | G06Q 40/02 705/38 |
| 2003/0069859 A1* | 4/2003 | Hoffman | G06Q 10/06 705/400 |
| 2003/0220875 A1* | 11/2003 | Lam et al. | 705/45 |
| 2003/0226028 A1* | 12/2003 | Kra | H04L 9/3236 726/26 |
| 2004/0068513 A1* | 4/2004 | Carroll | G06Q 10/10 |
| 2004/0143522 A1* | 7/2004 | Wall | G06Q 40/02 705/34 |
| 2004/0143548 A1* | 7/2004 | Meier | G06Q 20/00 705/40 |
| 2004/0215618 A1* | 10/2004 | Wacke | G06Q 10/10 |
| 2004/0267642 A1* | 12/2004 | Stenz | G06Q 10/087 705/28 |
| 2005/0050445 A1* | 3/2005 | Vasey | G06F 17/2247 715/237 |
| 2005/0187872 A1* | 8/2005 | Schmidt | G06Q 20/102 705/40 |
| 2005/0246250 A1* | 11/2005 | Murray | G06Q 30/04 705/30 |
| 2005/0278221 A1* | 12/2005 | Hahn-Carlson | G06Q 20/20 705/16 |
| 2006/0085306 A1* | 4/2006 | Schulte | G06Q 40/02 705/31 |
| 2006/0150085 A1* | 7/2006 | Davis | G06F 17/2247 715/255 |
| 2006/0155618 A1* | 7/2006 | Wyle | G06F 17/243 705/31 |
| 2006/0178961 A1* | 8/2006 | Stanley et al. | 705/31 |
| 2006/0202012 A1* | 9/2006 | Grano | G06Q 20/04 235/379 |
| 2006/0253388 A1* | 11/2006 | Newton | G06Q 40/00 705/39 |
| 2006/0271477 A1* | 11/2006 | Allin | G06Q 10/00 705/40 |
| 2006/0277123 A1* | 12/2006 | Kennedy | G06Q 40/02 705/35 |
| 2006/0282376 A1* | 12/2006 | Goldberg | G06Q 40/025 705/38 |
| 2007/0005463 A1* | 1/2007 | Davis | G06Q 30/04 705/34 |
| 2007/0005500 A1 | 1/2007 | Steeves et al. | |
| 2007/0100711 A1* | 5/2007 | Stroh | G06Q 10/087 705/28 |
| 2007/0136157 A1* | 6/2007 | Neher et al. | 705/31 |
| 2007/0136190 A1* | 6/2007 | Engle | G06Q 20/102 705/40 |
| 2007/0156584 A1* | 7/2007 | Barnes | G06Q 40/02 705/40 |
| 2007/0172107 A1* | 7/2007 | Jones | G06K 9/033 382/137 |
| 2007/0199985 A9* | 8/2007 | Truitt | G06Q 20/16 235/380 |
| 2007/0244834 A1 | 10/2007 | Silverbrook et al. | |
| 2007/0255634 A1* | 11/2007 | Alley | G06Q 40/00 705/35 |
| 2007/0271177 A1* | 11/2007 | April | G06Q 40/025 705/38 |
| 2007/0283287 A1* | 12/2007 | Taylor | G06Q 30/06 715/769 |
| 2007/0299751 A1* | 12/2007 | Jenkins | G06Q 30/04 705/31 |
| 2008/0022107 A1* | 1/2008 | Pickles | G06F 17/218 713/176 |
| 2008/0071600 A1* | 3/2008 | Johnson | G06Q 10/063112 705/7.14 |
| 2008/0082432 A1* | 4/2008 | Baker | G06Q 10/10 705/31 |
| 2008/0133303 A1* | 6/2008 | Singh | G06Q 10/06 705/35 |
| 2008/0189368 A1* | 8/2008 | Rothschild | B07C 3/00 709/205 |
| 2009/0037247 A1* | 2/2009 | Quinn | G06Q 10/06375 705/7.37 |
| 2009/0043678 A1* | 2/2009 | Bizri | G06Q 10/06 705/30 |
| 2009/0276340 A1* | 11/2009 | Knapp | G06Q 40/12 705/30 |
| 2009/0319402 A1* | 12/2009 | Manista | G06Q 20/14 705/30 |
| 2009/0327108 A1* | 12/2009 | Swierz | G06Q 20/14 705/31 |
| 2010/0070394 A1* | 3/2010 | Wyle | G06F 17/243 705/31 |
| 2010/0161460 A1* | 6/2010 | Vroom | G06Q 40/123 705/31 |
| 2010/0161466 A1* | 6/2010 | Gilder | G06Q 20/04 705/34 |
| 2011/0196766 A1* | 8/2011 | Licardi | G06Q 30/0603 705/30 |

(56) References Cited

U.S. PATENT DOCUMENTS

| | | | |
|---|---|---|---|
| 2011/0255794 A1* | 10/2011 | Neogi | G06K 9/00442 382/203 |
| 2011/0258170 A1* | 10/2011 | Duggan | G06K 9/00442 707/705 |
| 2012/0185368 A1* | 7/2012 | Schloter | G06Q 40/12 705/30 |
| 2012/0215670 A1* | 8/2012 | Pinkerman | G06Q 40/123 705/31 |
| 2012/0265655 A1* | 10/2012 | Stroh | G06Q 40/00 705/30 |
| 2012/0290453 A1* | 11/2012 | Manista | G06Q 20/14 705/30 |
| 2012/0323748 A1* | 12/2012 | Lee | G06Q 10/06 705/30 |
| 2013/0110686 A1* | 5/2013 | Berrington | G06Q 40/00 705/30 |
| 2013/0191255 A1* | 7/2013 | Wolfe | G06Q 40/10 705/30 |
| 2013/0282535 A1* | 10/2013 | Bhaowal | G06Q 20/12 705/30 |
| 2014/0089150 A1* | 3/2014 | Wong | G06Q 40/10 705/30 |
| 2014/0198969 A1* | 7/2014 | McRae | G06Q 40/10 382/138 |

OTHER PUBLICATIONS

Developing a Paperless Mindset, Baron Jonathan A, Accounting Technology, Sep. 2005, ABI/Inform @ Professional Advanced pp. 5.*

* cited by examiner

Figure 8

SYSTEM AND METHOD FOR ONLINE BILL PAYMENT

BACKGROUND OF THE INVENTION (a) Field of the Invention

The present invention relates to software and systems for use in financial and associated transactional solutions and delivery of services. More particularly, the present invention relates to systems that present for review completed or partially completed electronic documents or other work product, such as tax and accounting forms, e.g. tax returns, for accuracy and approval.

(b) Background of the Invention

As companies continue to strive for efficiency, consistency and flexibility, computers and software executed on computers are increasingly relied upon to automate, semi-automate, enhance, quicken and improve business processes. This is true even in fields of professional service providers, such as accountants and other financial professionals and attorneys, and fields in which standardized procedures and documents are critical to and may even govern acceptable and "best" practices.

To help accounting professionals, such as accounting firms, provide and manage accounting related professional services to clients, such as corporations and even individuals or partnerships, companies, such as Thomson Reuters Corporation ("Thomson"), have developed, marketed and sold software products and services, such as the Thomson CS Professional Suite of software products. With some of these products, the accounting firm uses the professional software on its computer system (the "accountants system") and provides one or more of its clients with a client-side solution that operates on its clients' computer system (the "client system") that may be set-up to fit clients' particular needs and situations.

There currently exist solutions available and marketed to professionals and to their clients that provide bookkeeping, accounting and other financial services. For instance, Thomson's CS Professional Suite of accounting products provides tools and solutions for accountants, accounting firms (accountant systems) and their clients (client systems). For instance, Thomson's Client Bookkeeping Solution™ ("CBS") is a client accounting software solution used in maintaining a company's financial or accounting records or "books." CBS is a fully functional check-writing and bookkeeping software for use by both accountants and their clients. CBS may be customized by accounting firms to streamline clients' day-to-day bookkeeping tasks and to provide functional capabilities best suited for clients' needs. Using CBS, accountants may import client data from client bookkeeping solutions, such as QuickBooks Pro®/Premier/Enterprise, Peachtree®, Microsoft Office Accounting®, Paychex, and BusinessWorks® formats, directly into accounting write-up software, for example Thomson's Write-Up™ CS product. Write-Up CS enables accountants to provide customized accounting services that efficiently meet their clients' needs, including providing analytical services, standard and custom reports, and financial statements. Write-Up CS transforms high-level financial data using its Report and Financial Statement Editor to generate reports and financial statements. Client transaction data may be transferred directly into the accountants' Write-Up CS™ software solution to produce reports and financial statements without having to reenter data. Other products, such as Thomson's Trial Balance CS™, Payroll CS™, UltraTax CS™, and Engagement CS™ applications, may be used to perform further functionality, for example, data sorting and presentation, payroll related processing, customizable financial statements, engagement workflow and document management, and tax return preparation and filing.

With CBS, an accounting firm may provide clients with CBS software, such as by CD or over the Internet using ASP technology (CBS ASP) via NetClient CS™ portals. CBS clients may be set up using information from the accountant's Write-Up CS™ software. The accountant's client may use CBS to, among other things, record and print checks, record transactions, and generate reports. Periodically, clients transmit to the accounting firm transaction details, such as via email, web portal, or on disk, whereupon data is complete and organized for transfer to the accountant's Write-Up CS software solution, for example.

An alternative means of importing client information into the Write-Up CS, for example, is Thomson's Accountant's Gateway™. Accountant's Gateway provides a bi-directional exchange of data between accounting databases to external client bookkeeping systems (also referred to as client accounting systems) involving data of different, external formats. Accountant's Gateway allows service providers to seamlessly and automatically receive and translate client data from clients and to translate and transmit data back to client systems. Further, Accountant's Gateway facilitates clients' retaining of records of their financial details in electronic forms for many purposes, including accounting and evaluation purposes and provides a data exchange capable of both importing and exporting financial data across multiple and varied formats.

As professional service providers continue to interact with clients electronically and to deliver work product electronically, there is an increasing need for the service provider to secure payment before delivering in final usable or fileable electronic document to its clients. One problem with electronic exchange of documents for review and acceptance by clients is that once the work is done, the data collected, the forms processed, and the tax calculated, for example with a tax return, then the service provider loses some control over receipt of payment for their work product or service provided.

In the field of accounting software architectures, the available prior art fails to provide a method of integrated document review and payment of a corresponding invoice for the work performed for the tax and accounting documents during the current billing cycle. A need exists to provide a seamless way of reviewing documents and filing them, accounting for the receipt of payment in an automated or semi-automated manner, facilitating clients' efficient and organized filing of tax documents in electronic form, and payment for accountant service provider's services. Existing systems may provide for online bill payments, but fail to provide an integrated document review and online bill pay whereby the documents are filed in an automated or semi-automated manner upon review of the tax and accounting documents and payment of the services during the billing cycle.

SUMMARY OF THE INVENTION

In accordance with the present invention, tax and accounting information is collected by a service provider (accounting firm) from a client. In a preferred embodiment, a web-based interface between accounting firm and client is provided that effectively receives and translates client data from a plurality of clients automatically or semi-automatically. For instance, in the case of the Thomson suite of solutions, the online bill payment may receive client data through a web-based tool, such as, for example, Accountant's Gateway™, including in external or non-common formats, into an accountant write-up solution, for example Thomson's Write-Up CS™. In another embodiment, tax and accounting data is collected in some other way, including via email, web portal, or on disk, whereupon data is complete and organized for transfer to the accountant's Write-Up CS software solution, for example. After review and upon receiving a request or instructions to deliver a final or fileable version of the work product, the system and method of the present invention presents an electronic invoice or other statement for payment by the recipient. Delivery of the final fileable work product is conditioned upon payment of the services rendered to produce the fileable work product, i.e., a document that is appropriate for filing with a concern or entity, such as a federal or state taxing authority. The preliminary document is unfileable in the sense that it bears some indicia or irregularity not commonly associated with a document to be filed with a concern. This does not necessarily mean that the document is incapable of being filed with such a concern.

Once translated and loaded into the accountant-side solution and related data base, the client data is entered into a tax or accounting form, such as, for example, a tax return. Information may be entered into tax or accounting forms in a manually, automated or partially automated manner. In a manual manner, the tax service provider physically reviews the information collected from the client and prepares tax data forms based upon the information provided and the services to be rendered for the client.

Once the tax and accounting forms have been created, the service provider then uploads the prepared tax return to the online bill payment interface, such as on a web-based portal service such as NetClient CS. When uploading the file, the file should be converted into an image form, e.g., with draft watermarking or the like, so that the information provided on the form cannot be easily extracted or copied. In one embodiment, the image file could be a portable document format (PDF). In a separate embodiment, the document might be created using formats such .jpg, .gif, .png, and .tif and other such image formats. Further, the tax return should be converted, presented or delivered for review in an unfileable, non-final condition such as by placing a watermark on the image of the tax return. The document can be converted into an unfileable document by applying the watermark directly onto the image, or when rendering the image in the portal software such as NetClient CS, applying the watermark image digitally, for example. Other techniques may be used.

At the close of each billing cycle or upon triggering of a billable event, whether determined for example by time, date or the completion of work, an invoice, statement or other notice is created that reflects the work performed for the client and associated cost or bill with respect to the matter. For example, if the work performed is preparation of a tax return for a taxpayer, then at the completion of the matter and upon approval or acceptance of the return by the taxpayer, an invoice relating to the tax and accounting documents is presented to the taxpayer for payment. An invoice, which is used herein in the broadest sense to include any sort of statement or notice of amount owed for work performed. For example, the invoice may reflect the work completed during a billing cycle or that triggered the billing event, the hourly rate of the associate or partner performing the work, a description of the work performed, and any additional costs such as related fees or expenses, including governmental fees and expenses. Alternatively, an invoice may indicate nothing more than the amount owed to the service provider by a client associated with the services rendered and work product generated. The invoice of the present invention may be generated manually or automatically using known techniques.

Once the invoice is created, it may be loaded into a web-based portal such as NetClient CS. The invoice may be rendered in a markup language, such as, for example, hypertext markup language ("html"). In this manner the text can be more easily rendered in any web-browser, such as, for example, Microsoft Internet Explorer, Mozilla Firefox, or Apple Safari.

Once the reviewable, non-final tax and accounting documents are uploaded into a web-based portal such as NetClient CS, and the invoice is made available to view online, such as through NetClient CS, the client is then notified. The client may be notified a number of ways, including an email sent manually or automatically that directs the client to the portal preferably via hyperlink embedded in the email. In a preferred embodiment, the hyperlink will automatically and securely log the user into the user account, and direct the user to the that client's non-final tax and accounting documents previously uploaded to the NetClient CS system. In an alternative embodiment, the user may be notified in person, via a phone call, or a notification once the user logs into NetClient CS providing the user with an indication that new documents have been uploaded for review.

Once the user logs into NetClient CS, the user can review the non-final document(s) prepared by the accounting service provider. In one embodiment, the tax or accounting document viewed by the client has a watermark on the document making the document unfileable. The image of the tax return allows the client to review the document, but provides protection against the client filing the document without paying for the services rendered by the accounting service provider. The unfileable image of the present invention provides a deterrent to dissuade a client from easily printing and filing the document without paying for the services rendered.

If the client is satisfied with the non-final tax or accounting document, the user can accept the tax or accounting document, and proceed to the invoice. The interface of the NetClient CS screen comprising the tax or accounting documents may further include softkeys (digital buttons integrated into the interface), whereby the user-client can review the tax or accounting document and accept or reject the document as accurate. If the client rejects the tax or accounting document, the client can contact the accounting service provider to indicate his or her reasons for the rejection of the document. In one embodiment, the image of the document is rendered in a .PDF. In this embodiment, the user client may be able to makes notes directly onto the document using a PDF-writer such as Adobe Acrobat 8 Professional®. In an alternative embodiment, there may be a dialog or comment box within NetClient CS allowing the client to make comments or suggest changes to a document being declined. Alternatively, the client may simply download and print the document or form, and contact the accounting service provider directly or indirectly to suggest or propose changes to the tax or accounting document. If the client rejects the tax or accounting document uploaded into NetClient CS, the client may provide information related to the rejections along with corrections or additional data and the accounting service provider can make any and all necessary corrections or additions.

If the client accepts or approves of the unfileable document, the client will be directed to an online bill pay function. The online bill payment screen may display an invoice or statement reflecting, for example, the work or fees associated with the completed document, the hourly rate of the associate, partner, or other person performing the work, and any additional fees or costs such as flat fees or governmental fees, payments or expenses. Alternatively, the invoice may only reflect a total charge or value of the work done, without any further breakdown of the values. Preferably, the electronic billing invoice may further include softkeys whereby the user-client can accept or reject the terms of the invoice. If the user-client accepts the terms of the invoice, the user is directed to an online bill payment system, such as Neteller™, a product of Neteller PLC Group. Neteller or similar payment system processes the transaction, transfers funds from the client's account with a bank or with the payment system provider itself to the accounting firm's account with a bank or with the payment system provider itself. Transactions can be brokered using credit card payments, check, cash or deposit accounts, or a combination thereof.

Upon indication that the invoice has been paid or that payment has at least been initiated or is in process, the unfileable tax and accounting document may be further processed as a "final" and fileable document ready for signing, if necessary, and filing. The document may be filed electronically, automatically, or partially automatically, without the watermark as a final document. In an alternative embodiment, the tax or accounting documents may simply be sent to the client in an automated or partially automated manner, in electronic or hardcopy form.

The present invention addresses the shortcomings of the prior art and provides, among other things, a channel between accounting service providers, such as accountants and accounting firms, and their clients for review, modification, online payment and automated or partially automated filing of tax or accounting documents or other work product.

In one embodiment, the present invention provides a web-based accounting software application adapted to be used by a tax service provider for transacting delivery of fileable tax documents in exchange for payment for services. The software application includes means for generating a preliminary tax document; means for presenting the preliminary tax document to a user via web-based communication; means for the tax service provider receiving an approval message, the approval message indicating that the preliminary tax document is approved; means for the tax service provider receiving an indication of payment; and means for generating a final tax document upon receipt of the indication of payment, the final tax document being based at least in part upon data associated with the preliminary tax document. In addition, the preliminary tax document may be a draft tax return that is posted in an unfileable form to a web portal for review by a user, and, upon receiving the approval message and the indication of payment, the software application generates and posts to the web portal a final tax return accessible by the user. Further, the final tax document is a final tax return and is intended for filing with one or more of a federal taxing entity and a state taxing entity. Also, the tax service provider may electronically file the final tax return on behalf of a taxpayer. The web-based accounting software application may also include means for receiving a set of tax related information; means for generating the preliminary tax document based upon the set of tax related information; means for transmitting a notification that the preliminary tax document is ready for review; means for ensuring a payment for tax preparation services has been received; means for transmitting a notification that the final tax document is available; and means for permitting selective access to the final tax document. The means for permitting selective access may be responsive to information representing user identity, including one or more of the following: user name; social security number; password; previously assigned user identification number; birth date; address; and response to prompt. Also, the preliminary tax document may be presented to the user in an unfileable form, which may include one or more of the following: a watermark; a print defeat feature; obscured text. The web-based accounting software application may also include means for generating an invoice related to the preliminary tax document; means for notifying the user of the invoice for payment; and means for confirming payment processing related to the invoice. Also, the means for notifying the user includes generating an email to an address associated with the user. The email may include one or more of an invoice document, an embedded link to a web page to access an invoice document, and an embedded link to a web page to facilitate payment. The indication of payment may be received from a third party and indicates receipt of payment from the user.

In another embodiment, the present invention provides a method for delivering accounting related services in exchange for payment for such services using a web-based accounting software application. The method includes the steps of generating a preliminary tax document associated with a user and based at least in part on user related tax data; presenting the preliminary tax document to the associated user via web-based communication; receiving by the tax service provider an approval message, the approval message indicating that the preliminary tax document is approved; receiving by the tax service provider an indication of payment; and generating a final tax document upon receipt of the indication of payment and based at least in part upon data associated with the preliminary tax document.

In yet another embodiment, the present invention provides a computer-based system for providing tax return preparation services to clients over a network. The system includes: a central computer used by a tax service provider and adapted to execute an accounting software application adapted to generate and present fileable tax documents in exchange for payment, the central computer being further adapted to electronically communicate over a communications network with a plurality of client computers and to receive client tax data; wherein the accounting software application comprises: code adapted to generate a preliminary tax document based at least in part on the client tax data; code adapted to deliver the preliminary tax document to a client computer for review by a user of the client computer; code adapted to receive at the central computer an approval message from the client computer, the approval message indicating that the preliminary tax document is approved; code adapted to receive at the central computer an indication of payment; and code adapted to generate a final tax document upon receipt of the indication of payment, the final tax document being based at least in part upon client tax data.

In yet another embodiment, the present invention provides an accounting software application embodied in computer-readable media and for generating and presenting fileable tax documents in exchange for payment. The application includes: code adapted to generate a preliminary tax document based at least in part on client tax data; code adapted to present the preliminary tax document for review by a client; code adapted to receive an approval message indicating that the preliminary tax document is approved; code adapted to receive an indication of payment; and code adapted to generate a final tax document upon receipt of the indication of payment, the final tax document being based at least in part upon client tax data.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 8 is a screen shot illustrating a portal aspect of the present invention;

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
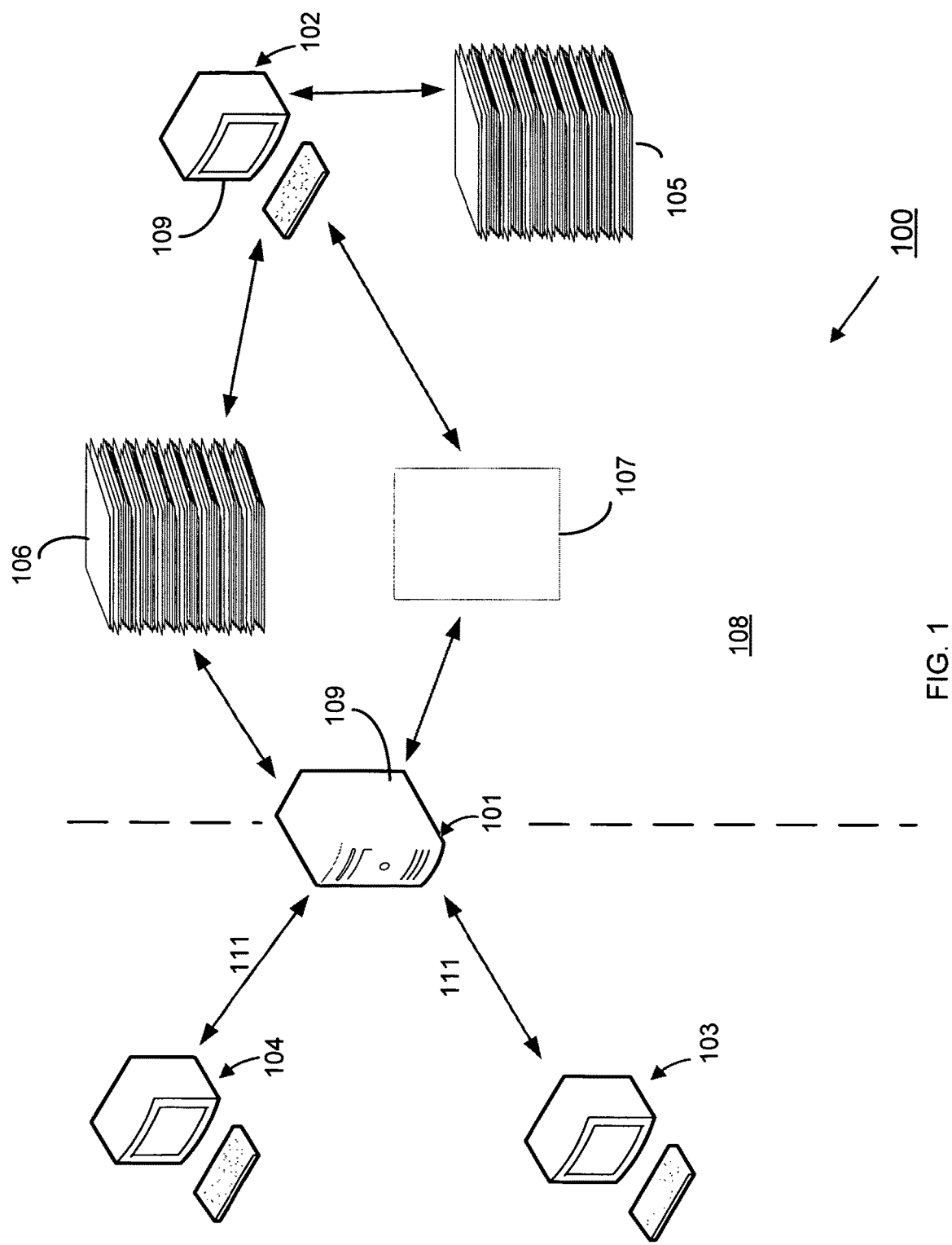
FIG. 1 is a block diagram illustrating an exemplary system embodiment of the present invention.

Referring now to FIG. 1, a computer-based system for delivery of professional services 100 comprises central computer or server or network of computers adapted to provide a web-based interface between a service provider 108 and its clients and having loaded thereon a server-side application 109, such as an accounting software application. The server-side application 109 may be adapted to work in conjunction with an overarching platform or solution, such as Thomson's Practice CS™ solution, to receive and translate client data from a plurality of client-side computer-based systems 103-104. The accounting system 100 may be, for example, maintained by a professional services provider, such as an accounting firm, and include a web-based interface whereby data, such as client tax data, is communicated preferably in a bi-directional manner to and from client systems, which represent companies or entities that are clients of the accounting firm and to whom services are rendered.

The computer systems typically include a display, input devices, such as a keyboard and/or a mouse, a central processing unit ("CPU"), an operating system, and software applications. The network connections 111 may be one or more of an intranet, Internet, WLAN, or Ethernet other wired and/or wireless connection.

The accounting system 100 collects or receives client information, such as client tax data, and prepares work product, such as accounting and tax related documents 106 as a paid service provided to a client. Financial, tax or other pertinent information ("client data") 105 may be collected via email, web portal, or on disk, or through an automated transference of digital copies of relevant documents, whereupon data is complete and organized for transfer to the accountant's software solution, for example Thomson's Write-Up CS. In a preferred embodiment, client information 105 is collected automatically. The accounting software application 100 of the present invention may be designed to work with a portal service or facility to facilitate web-based interaction between service provider 108 and its clients 103-104 as well as third parties, such as payment transaction entities.

FIGS. 2-10 disclose two exemplary embodiments associated with the invoicing functionality of the accounting software application of the present invention. Optionally, this functionality may be a part of an overarching practice management solution or suite of solutions, such as Thomson's Practice CS. In these examples, the description refers to Practice CS, which should be understood to refer generically to such systems. Also, although the invention may be described in terms of the service provider being an accounting firm and its clients as taxpayers and the work product as tax returns, it should be understood that this description is only exemplary and not limiting and is intended to help explain the functionality of the invention. The present invention is intended for and fully contemplates use with a variety of professional services concerns and related clients and documents. Specifically, Accounting firms may use the invention within the context of a practice management solution, such as Practice CS, whether locally or using Virtual Office CS, to allow their clients, such as taxpayers, to pay invoices online using a credit card. Once a payment has been accepted, allow the firm to then apply that payment to the outstanding invoice.

Figure 2:
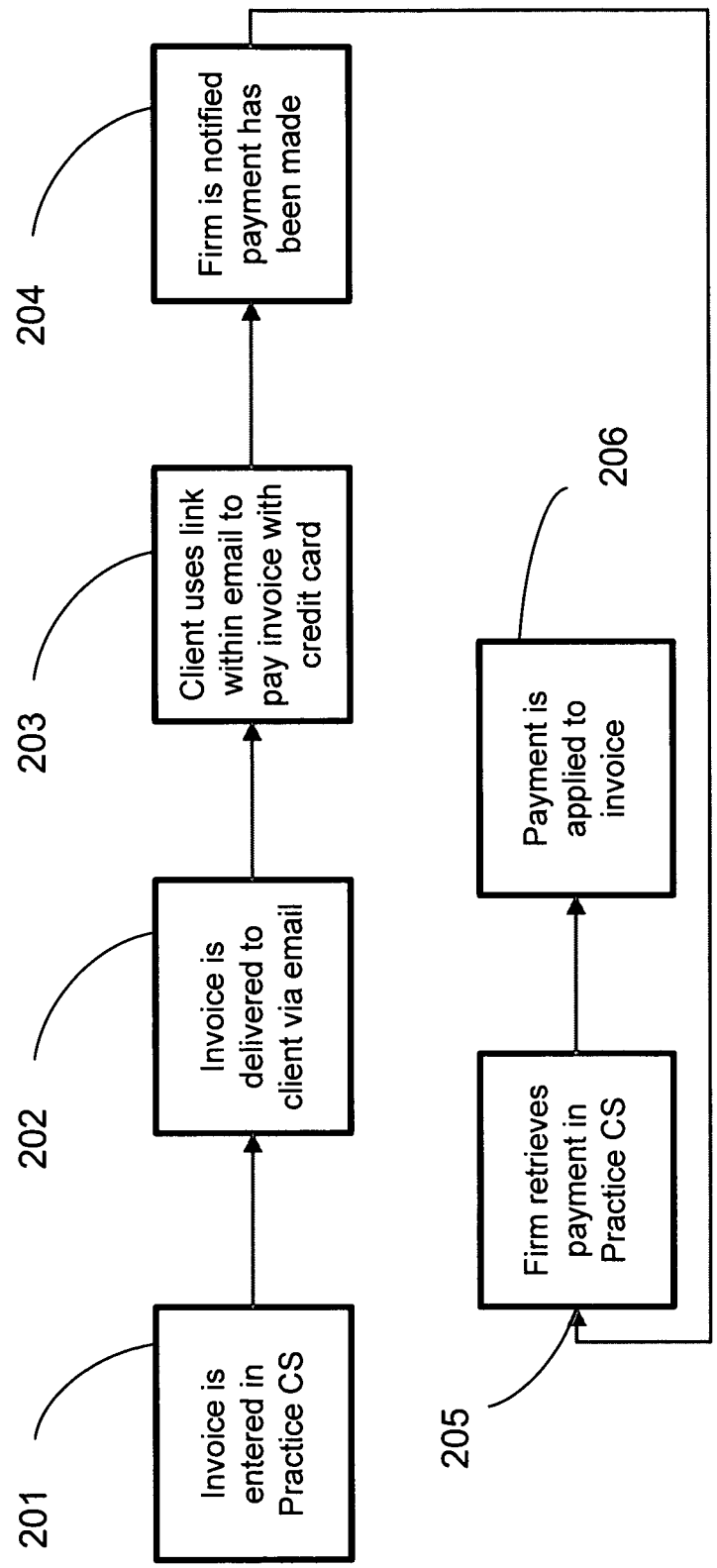
FIG. 2 is a flowchart illustrating a first embodiment of the invoicing functionality of the present invention.
Figure 3:
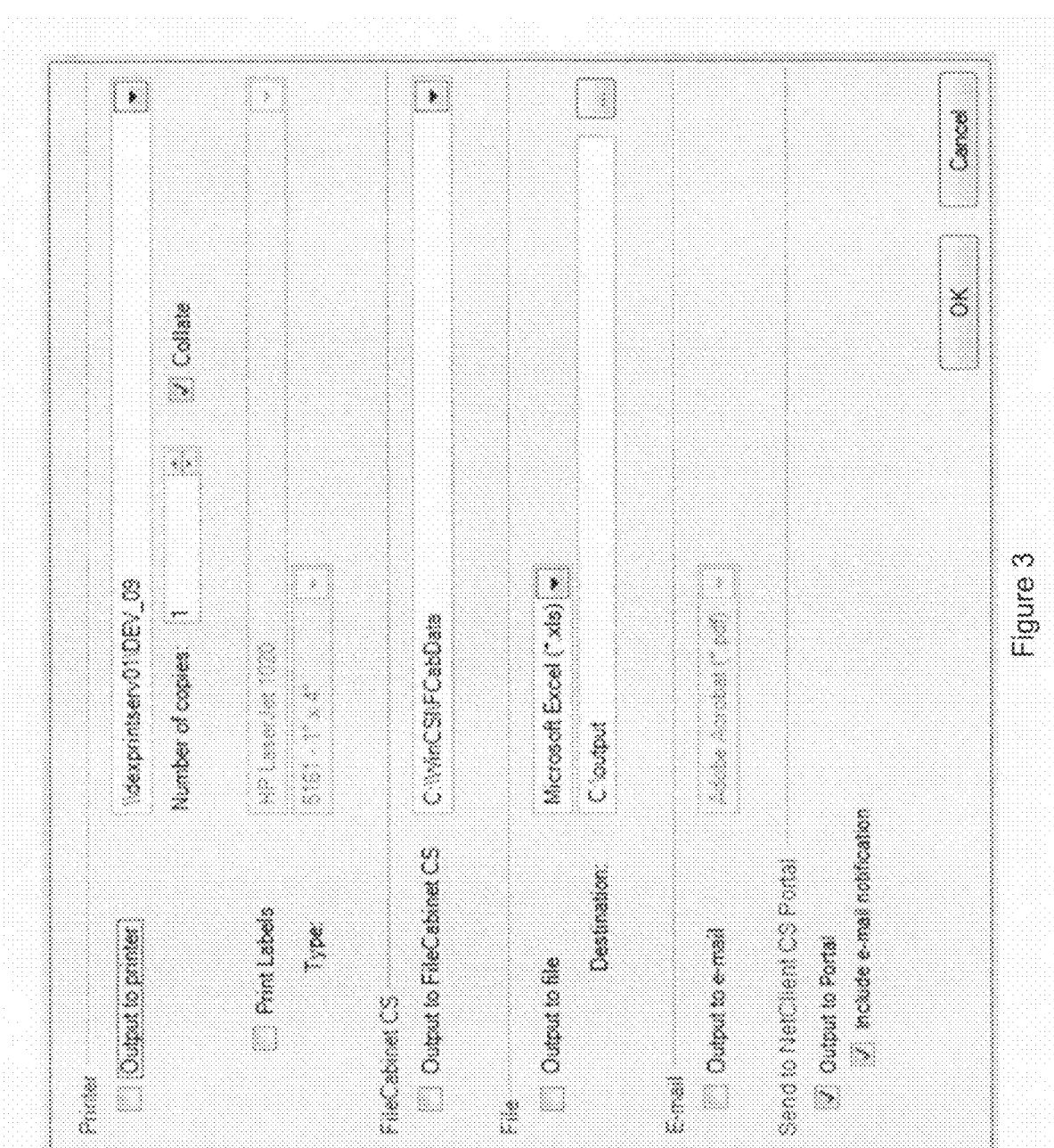
FIG. 3 is a screen shot illustrating exemplary notification and accessibility functionality for use in conjunction with the present invention.
Figure 4:
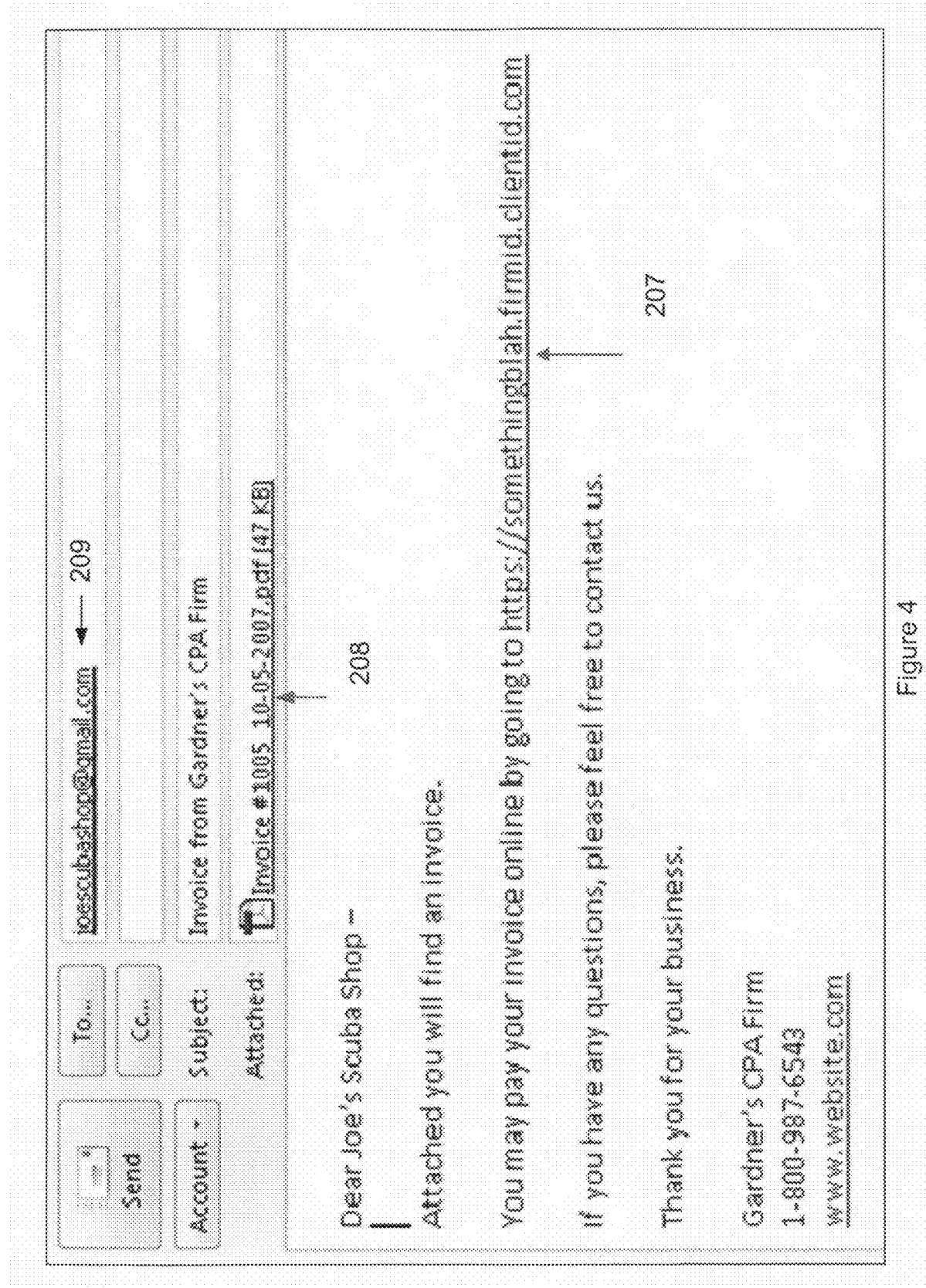
FIG. 4 is a screen shot of further notification, accessibility, and functionality of FIG. 3 in greater detail.
Figure 5:
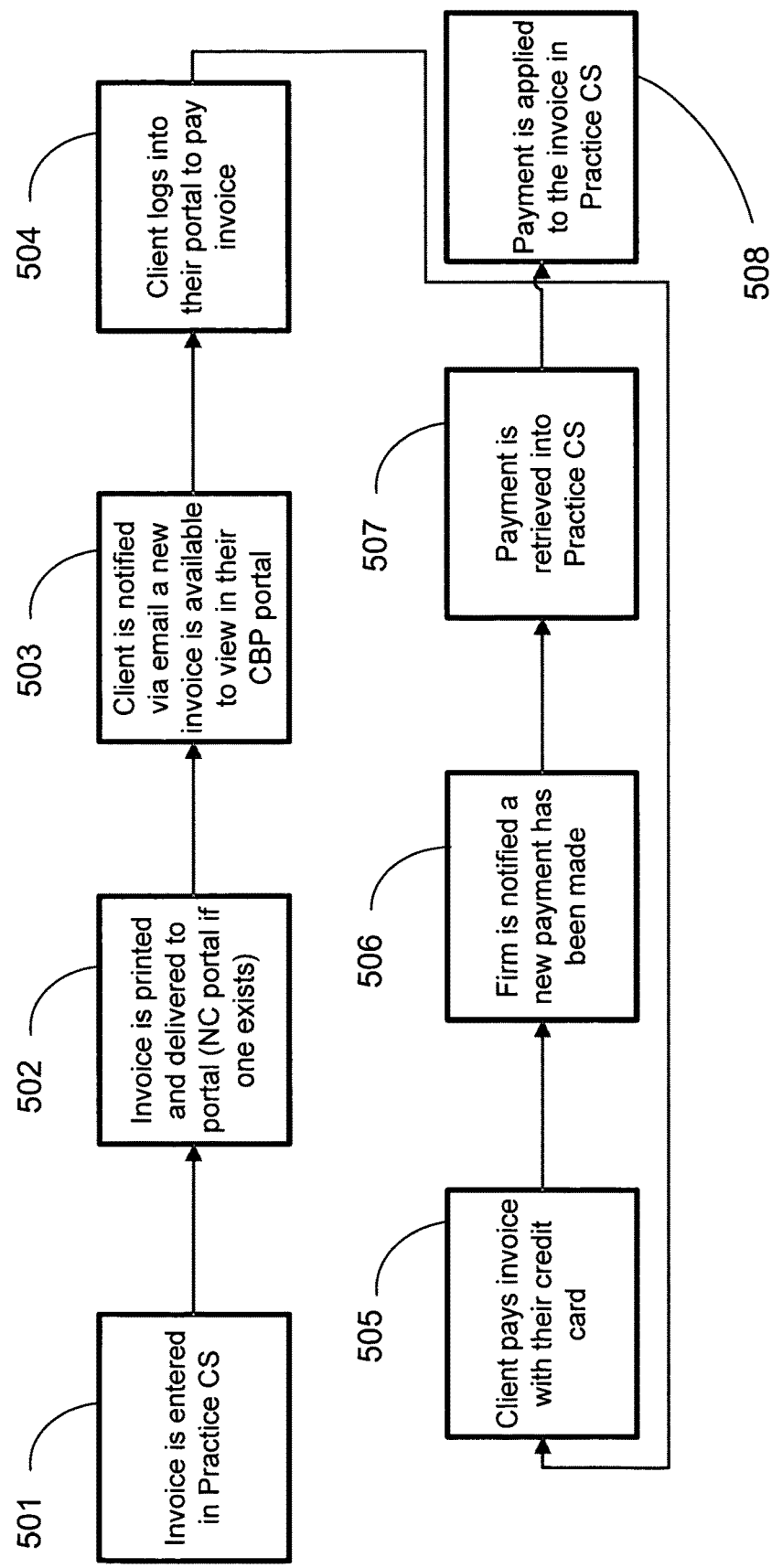
FIG. 5 is a flowchart illustrating a second embodiment of the invoicing functionality of the present invention.
Figure 6:
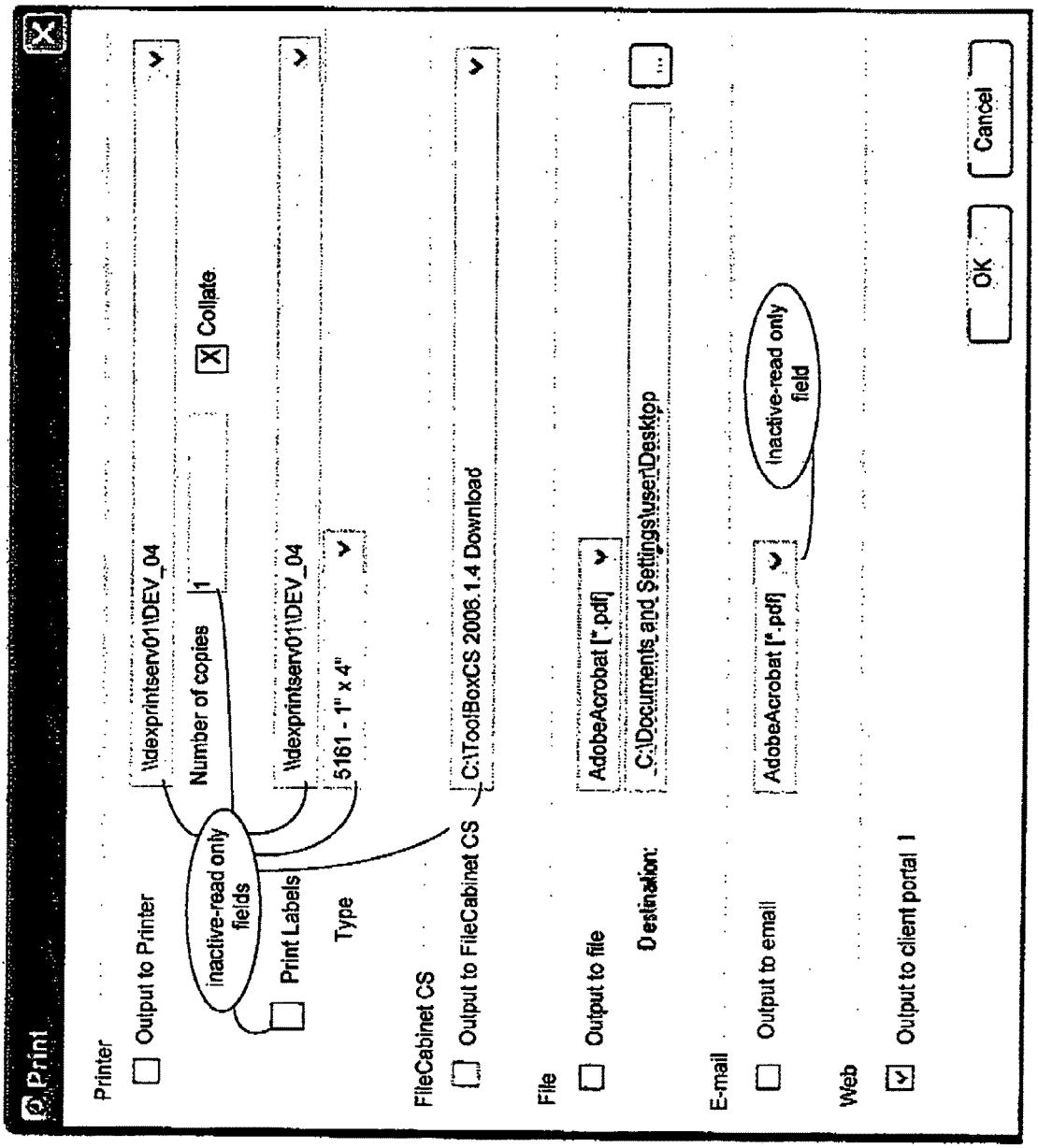
FIG. 6 is a screen shot illustrating a second exemplary notification, accessibility, and functionality for use in conjunction with the present invention.
Figure 7:
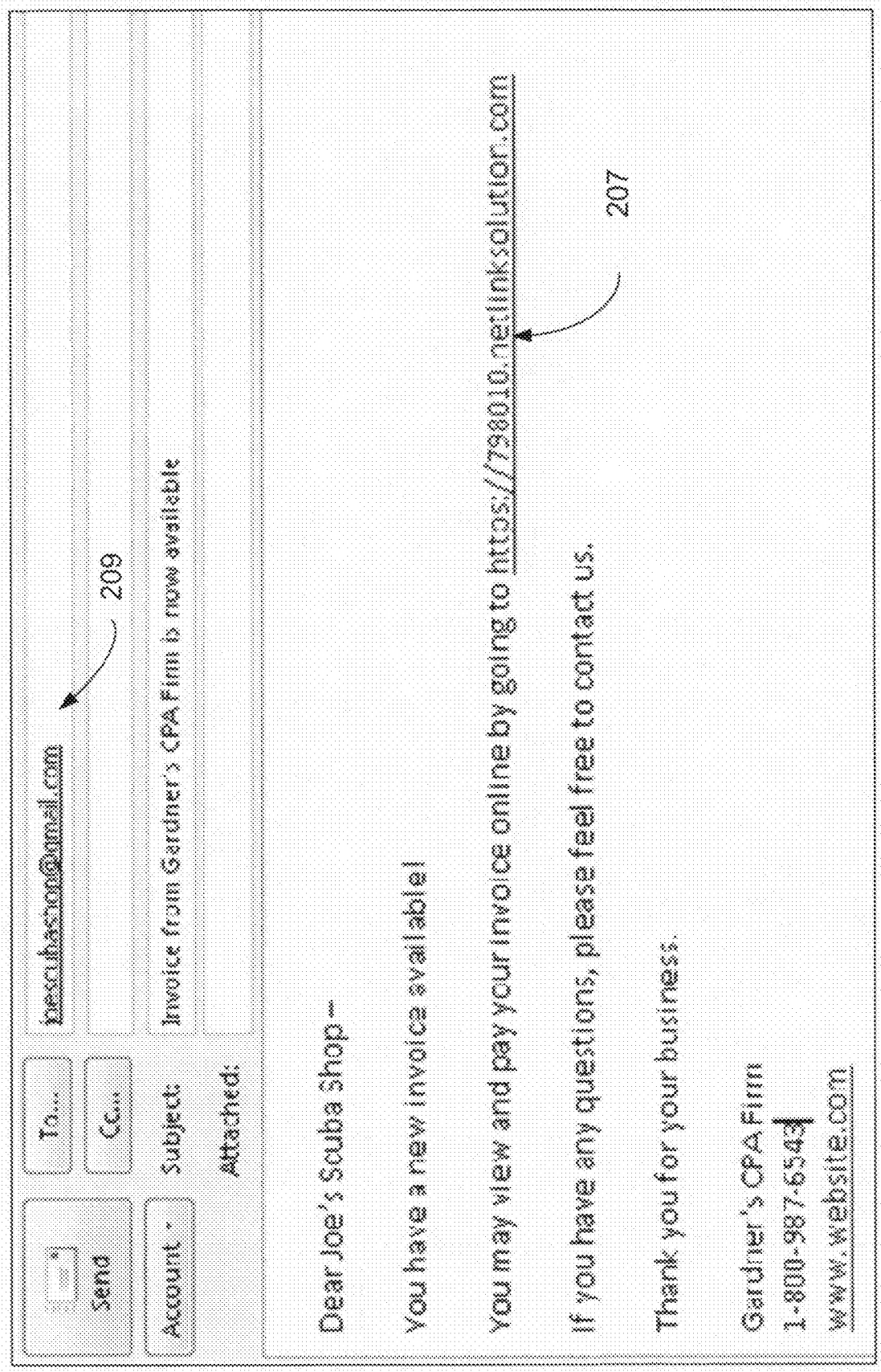
FIG. 7 is a flowchart illustrating a second embodiment of the invoicing functionality of the present invention.

In a first embodiment of the invoicing functionality, and with reference to FIGS. 2-4, FIG. 2 is a flow chart wherein at Step 201 an invoice is entered in Practice CS or other accounting solution. The accounting firm, for example, enters an invoice in Practice CS for the client. The invoice is associated with services performed and/or work product generated for the client. Now with reference to FIG. 3, at Step 202 the invoice is delivered to a client via email. For example, a professional user of the service provider or firm selects File|Print Invoices and Statements and may select the box output to printer and select printer to print hardcopies of the invoice. The user may select the Output to FileCabinet CS box, which relates to a document management aspect of an overarching accounting practice management solution, such as Thomson Practice CS, to save the document electronically at a desired location. A separate Output to File box is also available to the user for saving the document at yet another location and may allow the user to convert the document into a selectable format, e.g., MS WORD, Excel, pdf, etc. The user may also select the "Output to email" and "Online Bill Pay" boxes to generate a notification to the client and may also communicate invoice information to a third party to facilitate payment by the client.

As shown in FIG. 3, an exemplary screen associated with application 109 of the service provider 108 illustrates a preferred method for communicating invoice 107 by email to the client. The service provider 108 can accomplish this in several ways, for instance, the invoice 107 may be sent as an attachment to the email or as an embedded link to a web page. In this embodiment, the invoice 107 document may be compressed and converted into a form of image file capable of being viewed online, such as a such as a portable document format (.PDF) capable of being viewed on any computer terminal having Adobe Acrobat Reader®.

Now with reference to FIG. 4, an exemplary email of the sort sent to a client is illustrated. The email may contain, for example, the following information: the invoice in a PDF format; and a link to a site which will accept a credit card payment from the client. At Step 203 the client may use the link within the email to pay the invoice with a credit card. The client views the invoice in the email and then may click the link to pay invoice using their credit card. Once payment is accepted, at Step 204 the service provider is notified that a payment has been made by the client or at least that payment is being processed. At Step 205 the service provider retrieves the payment or payment related information into, for example, Practice CS. At Step 206 the payment or at least an indication of payment is applied to or associated with the invoice.

In a second embodiment of the invoicing functionality, and with reference to FIGS. 5-10, FIG. 5 is a flow chart wherein at Step 501, as in the previous embodiment, an invoice is entered in Practice CS or other accounting solution. Now with reference to FIG. 6, at Step 502 the invoice may be printed and delivered to a web portal (e.g., Thomson NetClient "NC" portal). The user at the service provider may select File/Print Invoices and Statements. The "Output to printer," "Output to FileCabinet CS" and "Output to file" boxes and related functions are as described above. Optionally, the user may select "Output to Client portal." At Step 503 the system notifies the client via email, see FIG. 7, a new invoice is available to view in their Client Bill Pay (CBP) portal, see FIG. 8. At Step 504, and with reference to FIG. 8, the client logs into their portal to view their invoice. The client can use the link, provided in the email notifying them of the new invoice, to access their CBP portal. Once the client is logged into their portal (NCNG), they will be presented with an "Invoices" set of options, among others. Now with reference to FIG. 9, the system via the portal provides the client with the ability to view all open or paid invoices. At Step 505, and with reference to FIG. 10, the client is presented with and may click on the "Pay Now" function to pay their invoice, for example with a credit card. Payment then may be processed by a third party electronic transaction provider, e.g., InterceptEFT, that acts as an intermediary between credit card companies, such as AMEX, VISA, Discover, and MasterCard. At Step 505, the firm or service provider is notified that the client has made a new payment. At step 506, payment may be retrieved into, for example, the Practice CS system. At Step 507, the system applies the payment to the invoice in Practice CS.

The service provider 108 processes the client data 105 imported into the accountant side application 109 and which may be loaded onto a database of client records or data as well as a database of forms or form templates. Client Data 105 may be used to prepare any relevant form or document 106, such as a tax return, manually, or automatically and may involve using tools to receive and format the data into the proper forms. System 100 may utilize a combination of complimentary client-server applications to provide a seamless bi-directional flow of data between the service provider 108 and the client systems 103-104. To this end, service provider 108 receives, formats and reformats data and data records to facilitate the data to be entered in the preparation of tax and accounting documents 106 such as, for example, tax returns and audit reports prepared by the service provider 108. Optionally, the accounting system 100 may encrypt/ decrypt data imported from the client systems using known encryption/decryption techniques.

At the conclusion of a billing cycle or event during a period in which work has been performed by the accounting service provider 108 or upon completion of such work, for the benefit of the client, the accounting service provider 108 will create an invoice 107. An invoice 107 is a financial document issued by the service provider 108 to a client indicating an amount of money owed to the service provider 108 by the recipient client and may include a description of the service provided and/or directions for the payment of the amount. An invoice 107 generally reflects the work completed during a billing cycle or event, the hourly rate of the associate or partner performing the work, a flat fee for a service or work product, and any additional costs such as flat fees or governmental expenses. However an invoice 107 may indicate nothing more than the amount of debt owed to the service provider 108. The invoice 107 of the present invention may be generated manually or automatically using known techniques and may be communicated to the client as described elsewhere herein.

In the preferred embodiment and with reference to FIG. 1, tax forms may be uploaded to a web-based portal maintained at computer or server or system 101, such as Thomson NetClient CS part of the Thomson Practice CS® suite of tools. The portal permits secure remote access by the client via a network connection such as the intranet, Internet, WLAN, or other wired and/or wireless connection. The portal may permit storage of data within the terminal, allowing for the hosting and access of documents such as an invoice 107 document. The portal provides a convenient and secure way to access documents and software, transfer data, and exchange information between the accounting service provider 108 and the client remotely.

Any financial document that is loaded onto, the portal for review and approval should be compressed and converted into a form of image file capable of being viewed online, whether as a proprietary format requiring a particular application, like NetClient, or as any common format capable of being viewed on any computer system, such as the portable document format (.PDF). When compressing and converting the financial document into an image file, the document may also be converted into an unfileable document such as by adding a conspicuous watermark to the image or placing added or obscuring text indicating that the financial document is not intended to be filed.

Once the tax and accounting documents 106 and invoice 107 have been imported into the portal, the accounting service provider 108 may notify the client. Notification along communication link 111 may be received in a number of ways, including a phone call from the accounting service provider 108, a notification from the website that new content has been delivered, an email, etc. The preferred method of notification is that an email is delivered to an email address associated with the portal client record or account. The email notification, e.g., FIG. 4, may include information such as a hyperlink 207 to automatically connect or log a user with the portal account and directly to the uploaded documents and/or provide an attached copy 208 of the document 106. Automatic log-in can be accomplished by including log-in details in the HTML query of the hyperlink 207, such as, for example, "<ahref="http//:www.somethingblah.firmid.clientid.com">Click Here</a>" where "somethingblah" is the web-address for the portal, "clientid" is the client's username, "firmid" is the client's password, and "Click Here" is the text displayed to the user. In an alternative embodiment, FIG. 7, the e-mail may merely notify the client that documents 106-107 have been delivered into the portal, or a link to the log-in screen may be provided without automatic log-in.

Figure 8:
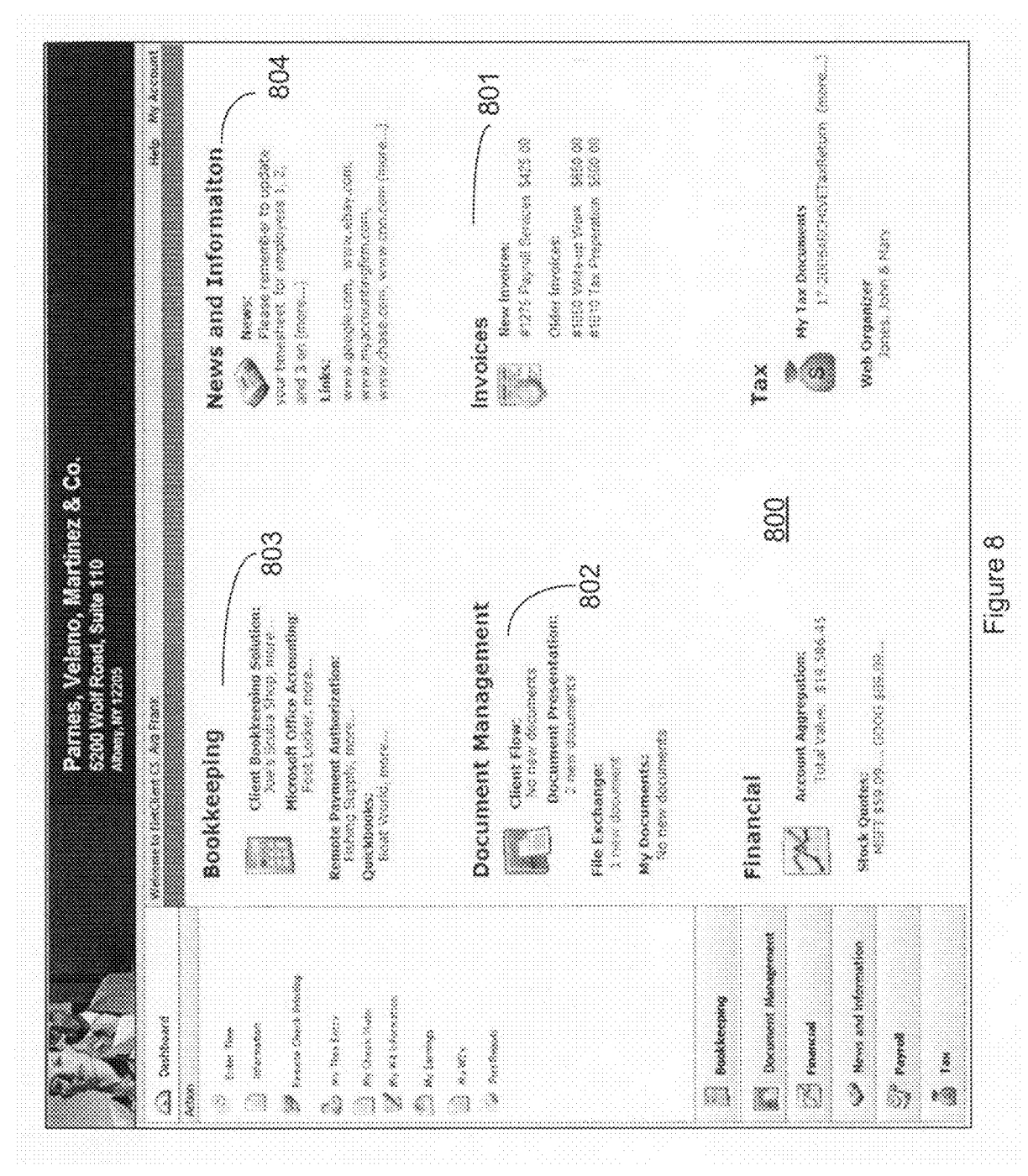

Once a client has received a notification that a document has been sent, the client logs into the portal. The client may log on using a remote, web-access portal or using a desktop-based access point 800 as shown at FIG. 8. Within the portal, there is an option to retrieve documents 802, invoices 801, bookkeeping 803, and news and information 804. Any newly available documents including financial documents 106 and invoices 107 may have hyperlinks directing the user to those documents. The client may then access the document via the hyperlink. If the document is a financial document 106, it is preferably displayed in a .PDF format so that it is viewable on any computer station having Adobe Acrobat Reader®.

Once the client has logged onto the portal, the client may review any tax documents 106 as well as the invoice 107. The copy of any financial documents uploaded to the portal will display a watermark on the financial document making the form unfileable. In a preferred embodiment, the watermark used on the prepared accounting document should make it explicitly clear that the document is not intended to be filed by including a watermark such as "DRAFT", "Unfileable Document" or "Do Not File". The use of the watermark deters clients from using the forms prepared by the accounting service provider 108 without paying for the service. Clients might otherwise take the preliminary document prepared for review and file or otherwise use it. Although the client could take the information from the form and recreate the form and file it, this approach adds a level of deterrence and protection.

In one embodiment, the client is able to make notes on the .PDF file. Note-making may be achieved by including a text box within the portal viewer. Alternatively, note-making may be achieved directly on the document. This later embodiment requires a .PDF writer such as Adobe Acrobat® 8 Professional, however such .PDF writing capability may be included in the portal software. In this embodiment, the client could either edit directly on the document or download the document and make any additions to the document and then upload the document to the portal. The client could be prevented from making any deletions or edits to the document to preserve the integrity of the original document created by the ASP service provider 108. The client may review the work to ensure they are satisfied and then review and acknowledge that the invoice 107 reflects the services agreed upon and performed by accepting the invoice 107 and agreeing to pay the amount indicated on the invoice 107.

Figure 9:
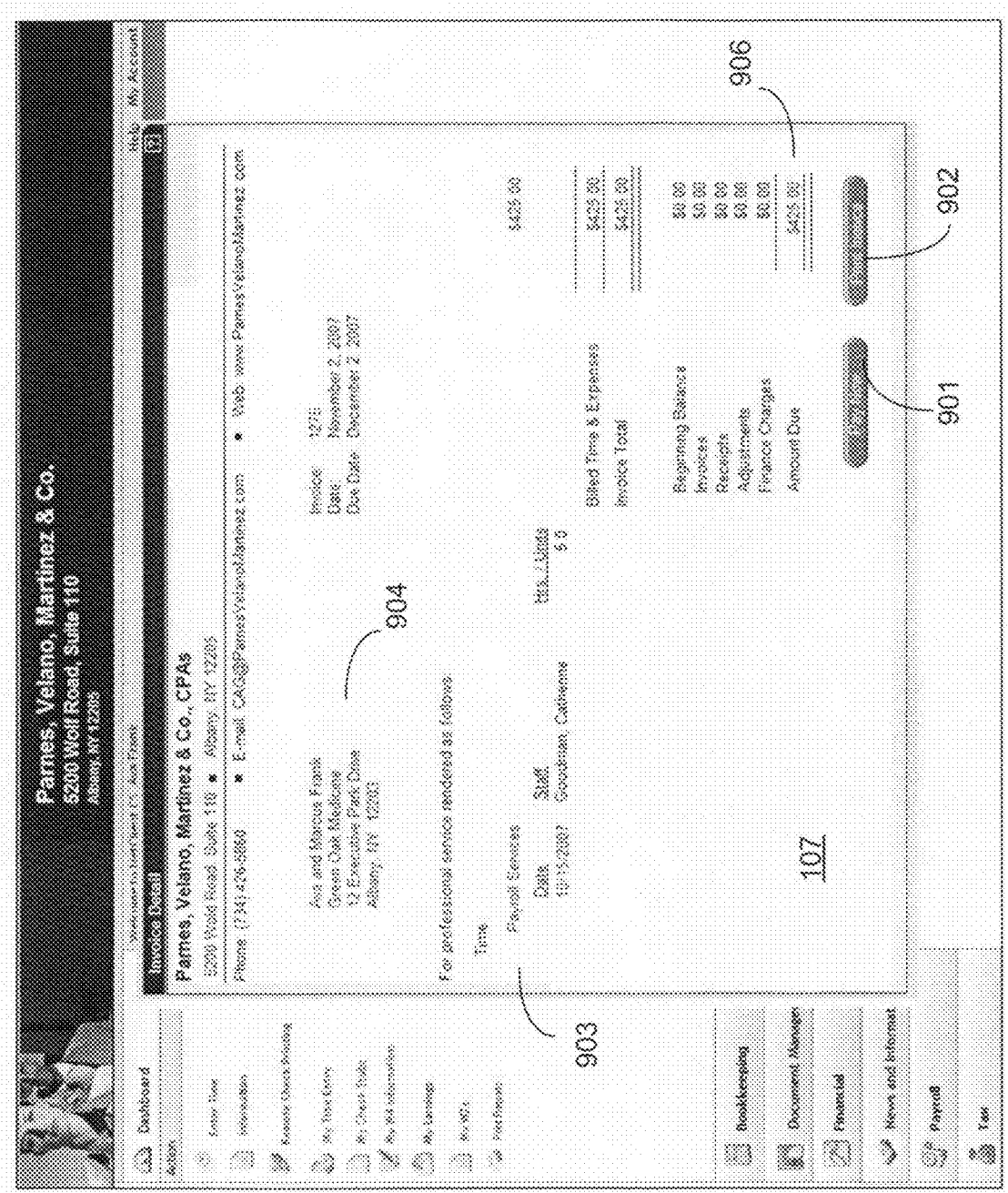
FIG. 9 is a screen shot illustrating invoicing and payment functionality of the present invention.

Once the client approves the financial document and agrees with the invoice, the client is then directed to pay the invoice 107. FIG. 9 shows an example illustration of a graphical user interface with an invoice 107 for a company named "Parnes, Velano, Martinez & Co., CPAs" presented to the client. In this example, the invoice 107 is written in a "markup language," such as HTML (Hypertext Markup Language). HTML is a subset of SGML (Standard Generalized Markup Language), a language for document representation that formalizes markup and frees it of system and processing dependencies. HTML documents are compatible with the World Wide Web. The HTML invoice 107 is rendered by an Internet browser application, such as the Microsoft Internet Explorer, Mozilla Firefox, or Apple Safari, which executes on the client's computer 103-104.

Figure 10:
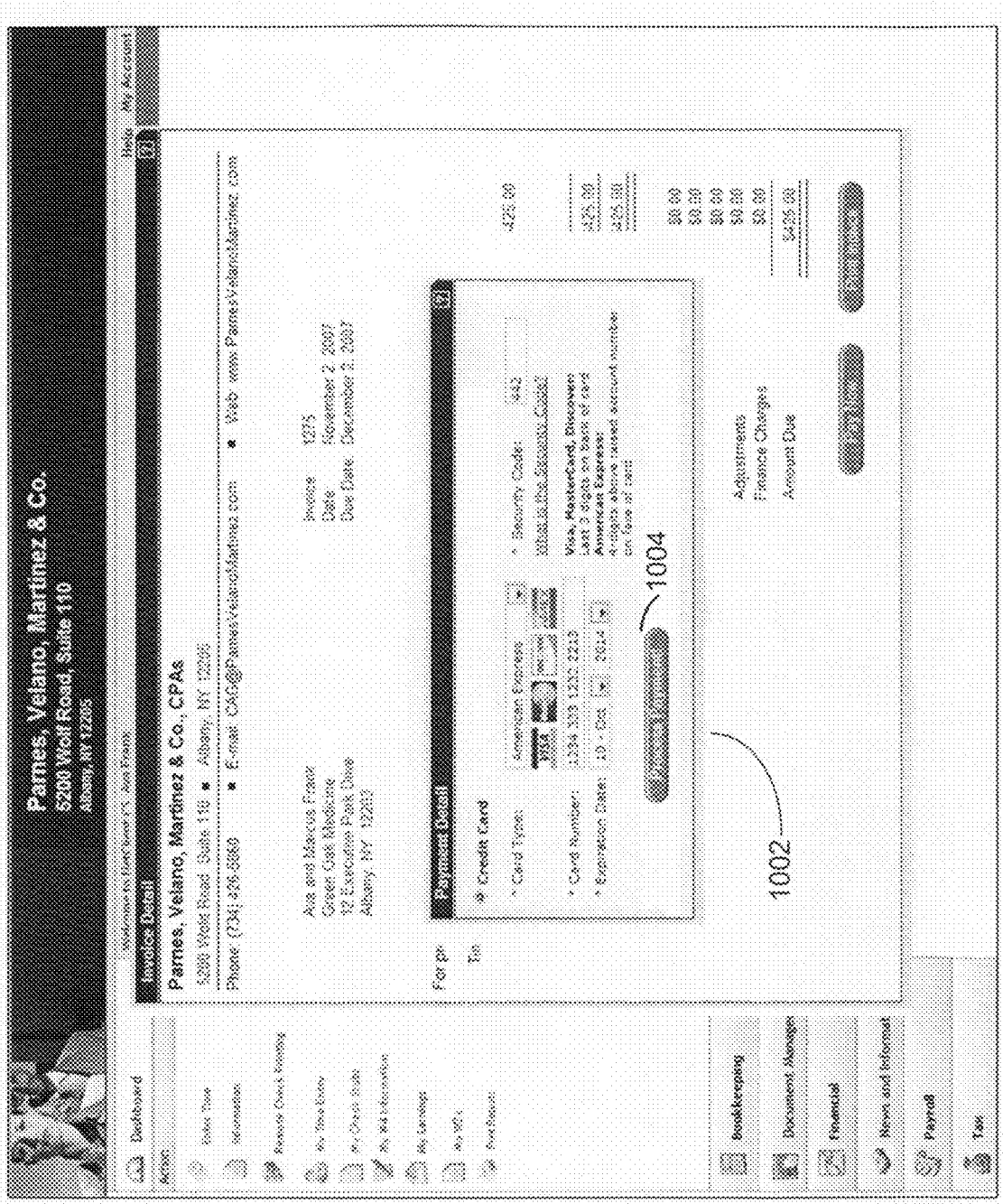
FIG. 10 is a screen shot illustrating payment functionality of the present invention in greater detail.

The invoice 107 may include multiple softkeys or buttons arranged as tabbed navigation points to facilitate quick movement from one section of the bill to another. In this example, there is a "Print Invoice" button 902 for printing a hard copy of the billing page shown in FIG. 9. A "Pay Now" button 901 activates a "Payment Details" screen 1002 shown in FIG. 10. The invoice 107 will preferably be paid with a credit card. Once the Payment Details screen 1002 is activated, the client enters credit card information such as card type, card number, expiration date, and security code. FIG. 10 shows an example of the "Payment Details" screen of the user interface window having been activated. The "Payment Details" screen is shown partially overlaid on the unpaid bill list window 900. The user will then select the "Process Payment" soft key 1004.

The invoice 107 has a main body that contains the billing particulars 903 including an amount due 906, an amount previously paid, a billing period, and statistics on work performed by service provider 108. On the "Details" page, the billing information in the body might include line items detailing work completed during a billing cycle, the hourly rate of the associate or partner performing the work, a flat fee charged for the service, and any additional costs such as flat fees or governmental expenses. The invoice in FIG. 9 is merely one example of many ways to organize and present data. In addition, the invoice may contain other items, such as embedded hyperlinks, executable code, and pop-up dialog boxes, which provide additional design flexibility and customization. The biller can essentially create any aesthetics, organization, and detail that it prefers.

The payment is made online using a secure Internet connection. The connection may be made secure using known encryption/decryption techniques. The payment is processed by an electronic money and payment solution, such as Neteller™ from the Neteller PLC Group. Once the payment is made, the service provider 108 is notified and the payment is received into the accountant-side system. Once the payment is received or at least an indication of payment being processed or upon receiving sufficient information from which payment may be effected at a later date, the service provider 108 may release the financial documents in a format suitable for filing or submission or other beneficial use by the client. For instance, any watermark included in the preliminary, unfileable document is removed from the document. The financial documents may then be filed by the client, or by the accounting service provider 108 on behalf of the client.

Figure 11:
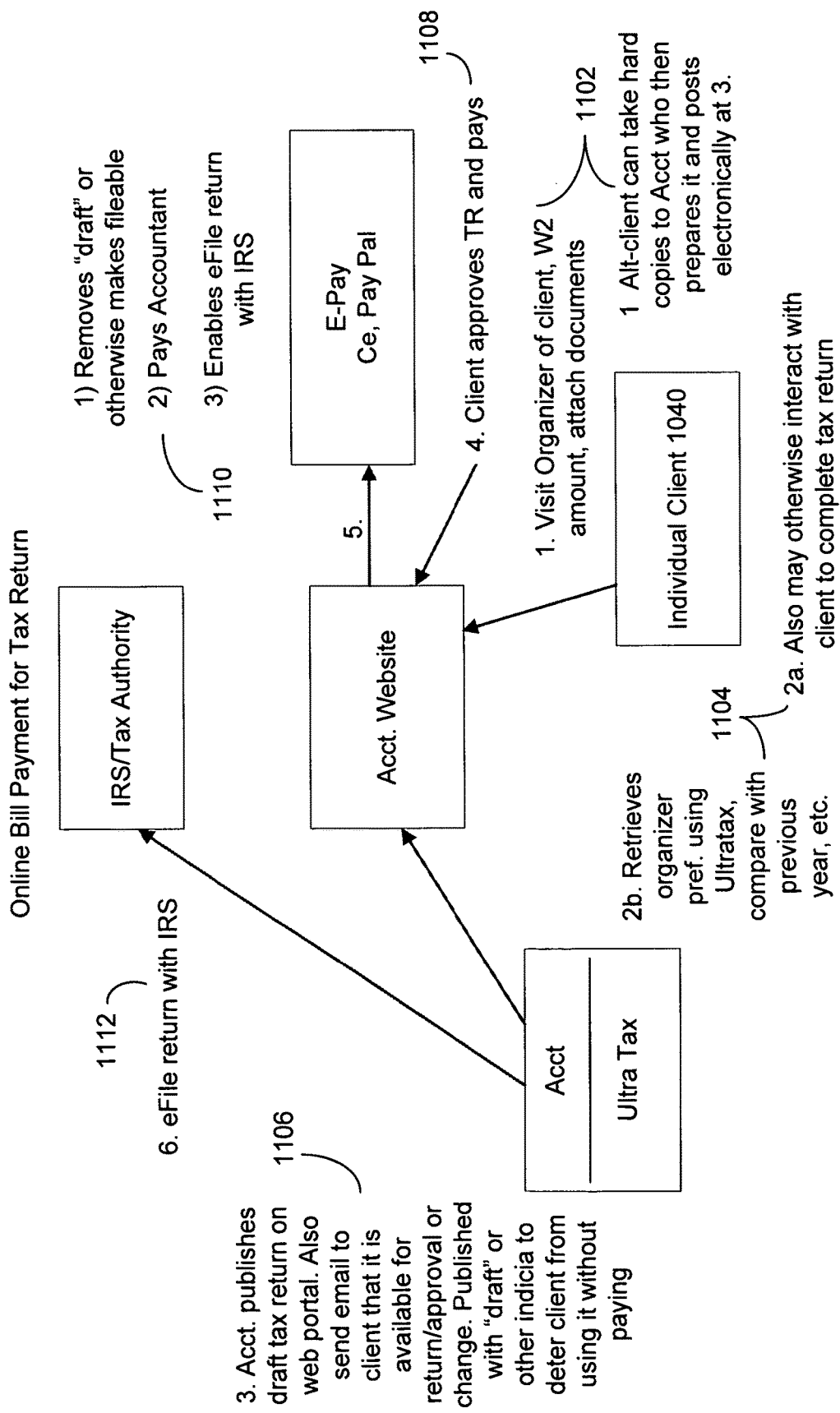
FIG. 11 is a schematic diagram of the interaction of service provider and client in the system of the present invention.

FIG. 11 illustrates one overall exemplary flow of the processing of data, documents and payment information in preparing and filing a client's tax return in accordance with the present invention. At step 1102, and in the context or preparing a client's individual 1040 tax return, the client may visit an organizer, such as made available by a portal service, such as Thomson's NetClient CS, and attaches, uploads or otherwise provides client information relevant to the preparation of a tax return, e.g., W2 forms, 1099 forms, etc. In the alternative, the client can provide hard copies of the documents to an accountant or firm who may then upload or otherwise enter the pertinent and necessary data for preparation of the tax return. The information is posted via the portal. Step 2a, 1104, represents other interaction that may occur between service provider 108 and their clients. At step 2b, the system 100 retrieves information uploaded onto the client organizer, for instance using Thomson's UltraTax product. In this step of preparing the tax return, the system may refer to previous year filings or documents or other related tax documents, e.g., state document preparation may rely on data entered in federal tax return preparation.

At step 3, 1106, the service provider publishes or posts the prepared draft tax return on the web portal. The system may also send a notification, such as by email, to the client to inform him that the tax return is ready for review, editing and approval. To prevent or deter the client from simply printing the draft tax return, the system places on the document a watermark or other indicia that the service provider has not authorized the filing of the document. At step 4, 1108, the client/taxpayer may review the posted draft tax return, such as using the portal, and may approve the draft return for final preparation. At this time, and as described above, the system prepares and provides to the client an invoice and the client pays for the service. The system may provide direct interfacing with third-party payment service providers, such as E-pay, and Pay-pal, to effect payment. As shown at step 5, 1110, once the client has effected payment, the system may be notified by the third-party. As shown, once notified, the system removes the "draft" watermark or other blocking indicia, preferably receives payment or at least confirmation of payment information, and prepares the final, fileable document and enables e-filing with the IRS and other tax entities. At step 6, 1112, the system may file the client's tax return directly with the IRS on behalf and with the approval of the client.

The present invention is not to be limited in scope by the specific embodiments described herein. It is fully contemplated that other various embodiments of and modifications to those described above may be made within the scope of the present invention and will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A web-based accounting software application adapted to be used by a tax service provider for automatically transacting delivery of fileable tax documents in exchange for payment for services, the software application being associated with a computer-based system operated by the tax service provider comprising:

means for automatically generating, by a tax service provider a preliminary tax document in a first format, the first format incorporating an element adapted to deter filing the preliminary tax document with a tax authority and otherwise being substantially in a fileable format;

means for presenting, by the tax service provider, the preliminary tax document to a user via web-based communication;

means for the tax service provider receiving an approval message, the approval message from the user indicating that the preliminary tax document is approved;

means for automatically generating, by the tax service provider, an invoice related to the preliminary tax document in response to the received approval message;

means for automatically notifying, by the tax service provider, the user of the invoice for payment, the notifying means automatically generating an email to an address associated with the user, wherein the email comprises one or more of an invoice document, an embedded link to access an invoice document, and an embedded link to a web page to facilitate payment;

means for determining, by the tax service provider, payment has been made by receipt of an electronic communication from a payment processing entity and automatically storing in a transaction record payment confirmation data related to the payment; and means for automatically generating, by the tax service provider, a final version of the preliminary tax document in response to determining payment has been made, wherein the final version of the preliminary tax document is the preliminary tax document in a second format excluding the element included in the first format, the element having been automatically removed in response to determining payment has been made, and being in a condition for filing with a tax authority.

2. The web-based accounting software application of claim 1, wherein the preliminary tax document is a draft tax return that is posted in an unfileable form to a web portal for review by a user, and wherein upon receiving the approval message and the indication of payment, the software application generates and posts to the web portal the final tax document as a fileable tax return accessible by the user.

3. The web-based accounting software application of claim 1, wherein the final tax document is a final tax return and is intended for filing with one or more of a federal taxing entity and a state taxing entity.

4. The web-based accounting software application of claim 3, wherein the tax service provider electronically files the final tax return on behalf of a taxpayer.

5. The web-based accounting software application of claim 1 further comprising:

means for receiving a set of tax related information;

means for generating the preliminary tax document based upon the set of tax related information; and means for transmitting a notification that the preliminary tax document is ready for review.

6. The web-based accounting software application of claim 1 further comprising:

means for ensuring a payment for tax preparation services has been received;

means for transmitting a notification that the final tax document is available; and means for permitting selective access to the final tax document.

7. The web-based accounting software application of claim 6, wherein the means for permitting selective access is responsive to information representing user identity, including one or more of the following: user name; social security number; password; previously assigned user identification number; birth date; address; and response to prompt.

8. The web-based accounting software application of claim 1, wherein the preliminary tax document is presented to the user in an unfileable form.

9. The web-based accounting software application of claim 8, wherein the unfileable form includes one or more of the following: a watermark; a print defeat feature; obscured text.

10. The web-based accounting software application of claim 1, wherein the indication of payment is received from a third party and indicates receipt of payment from the user.

11. A method for automatically delivering accounting related services in exchange for payment for such services using a web-based accounting software application, the method comprising:
  automatically generating, by a computer associated with a tax service provider, a preliminary tax document associated with a user and being in a first format and based at least in part on tax data related to the user, the first format incorporating an element adapted to deter filing the preliminary tax document with a tax authority and otherwise being substantially in a fileable format;
  presenting, by the computer associated with the tax service provider, the preliminary tax document to the user associated with the preliminary tax document via web-based communication;
  receiving, by the computer associated with the tax service provider, an approval message, the approval message from the user indicating that the preliminary tax document is approved;
  automatically generating, by the computer associated with the tax service provider, an invoice related to the preliminary tax document in response to the received approval message;
  automatically notifying, by the computer associated with the tax service provider, the user of the invoice for payment, the automatically notifying including automatically generating an email to an address associated with the user, wherein the email comprises one or more of an invoice document, an embedded link to access an invoice document, and an embedded link to a web page to facilitate payment;
  determining, by the computer associated with the tax service provider, payment has been made based on receipt of an electronic communication from a payment processing entity and automatically storing in a transaction record payment confirmation data related to the payment; and
  automatically generating, by the computer associated with the tax service provider, a final version of the preliminary tax document in response to determining payment has been made, wherein the final version of the preliminary tax document is the preliminary tax document in a second format excluding the element included in the first format, the element having been automatically removed in response to determining payment has been made, and being in a condition for filing with a tax authority.

12. The method of claim 11, wherein the preliminary tax document is a draft tax return and further comprising posting the draft tax return in an unfileable form to a web portal for review by the associated user, and upon receiving the approval message and the indication of payment, generating and posting to the web portal the final tax document as a fileable tax return accessible by the user.

13. The method of claim 11, wherein the final tax document is a final tax return and further comprising filing the final tax return with one or more of a federal taxing entity and a state taxing entity.

14. The method of claim 13 further comprising electronically filing by the tax service provider the final tax return on behalf of a taxpayer.

15. The method of claim 11 further comprising:
  receiving a set of tax related information;
  generating the preliminary tax document based upon the set of tax related information; and
  transmitting a notification that the preliminary tax document is ready for review.

16. The method of claim 11 further comprising:
  ensuring a payment for tax preparation services has been received;
  transmitting a notification that the final tax document is available; and
  permitting selective access to the final tax document.

17. The method of claim 11, wherein the preliminary tax document is presented to the user in an unfileable form.

18. The method of claim 17, wherein the unfileable form includes one or more of the following: a watermark; a print defeat feature; obscured text.

19. The method of claim 11, wherein the indication of payment is received from a third party and indicates receipt of payment from the user.

20. A computer-based system operated by a tax service provider for providing tax return preparation services to clients over a network, the system comprising:
  a central computer used by a tax service provider and adapted to execute an accounting software application adapted to process client tax data and generate and present fileable tax documents in exchange for payment, the central computer being further adapted to electronically communicate over a communications network with a plurality of client computers and to receive client tax data;
  wherein the accounting software application comprises:
    computer executable code adapted to automatically generate by the tax service provider a preliminary tax document in a first format and based at least in part on the client tax data, the first format incorporating an element adapted to deter filing the preliminary tax document with a tax authority and otherwise being substantially in a fileable format;
    computer executable code adapted to deliver, by the tax service provider, the preliminary tax document to a client computer for review by a user of the client computer;
    computer executable code adapted to receive at the central computer an approval message from the client computer, the approval message indicating that the preliminary tax document is approved;
    computer executable code adapted to automatically generate, by the tax service provider, an invoice related to the preliminary tax document in response to the received approval message;
    computer executable code adapted to automatically notify, by the tax service provider, the user of the invoice for payment, the computer executable code further adapted to automatically generate an email to an address associated with the user, wherein the email comprises one or more of an invoice document, an embedded link to access an invoice document, and an embedded link to a web page to facilitate payment;

computer executable code adapted to determine at the central computer payment has been made based on receipt of an electronic communication from a payment processing entity and automatically store in a transaction record payment confirmation data related to the payment; and computer executable code adapted to automatically generate, by the tax service provider, a final version of the preliminary tax document in response to determining payment has been made, the final version of the preliminary tax document being the preliminary tax document in a second format and based at least in part upon client tax data, the second format excluding the element included in the first format, the element having been automatically removed in response to determining payment has been made, and being in a condition for filing with a tax authority.

21. The system of claim 20, wherein the final tax document is a final tax return and is intended for filing with one or more of a federal taxing entity and a state taxing entity.

22. The system of claim 21, wherein the tax service provider electronically files the final tax return on behalf of a taxpayer.

23. An accounting software application embodied in non-transitory computer-readable media and for processing client tax data by a tax service provider and generating and automatically presenting fileable tax documents in exchange for payment, the application comprising:

code adapted to automatically generate, by a computer associated with a tax service provider, a preliminary tax document in a first format and based at least in part on client tax data, the first format incorporating an element adapted to deter filing the preliminary tax document with a tax authority and otherwise being substantially in a fileable format;

code adapted to present, by the computer associated with the tax service provider, the preliminary tax document for review by a client;

code adapted to receive, by the computer associated with the tax service provider, an approval message from the client indicating that the preliminary tax document is approved;

code adapted to automatically generate, by the computer associated with the tax service provider, an invoice related to the preliminary tax document in response to the received approval message;

code adapted to automatically notify, by the computer associated with the tax service provider, the client of the invoice for payment, the code further adapted to automatically generate an email to an address associated with the client, wherein the email comprises one or more of an invoice document, an embedded link to access an invoice document, and an embedded link to a web page to facilitate payment;

code adapted to determine, by the computer associated with the tax service provider, payment has been made based on receipt of an electronic communication from a payment processing entity and automatically store in a transaction record payment confirmation data related to the payment; and code adapted to automatically generate, by the computer associated with the tax service provider, a final version of the preliminary tax document in response to determining payment has been made, the final version of the preliminary tax document being the preliminary tax document in a second format and based at least in part upon client tax data, the second format excluding the element included in the first format, the element having been automatically removed in response to determining payment has been made, and being in a condition for filing with a tax authority.

24. An integrated online tax document review, service payment and tax return submission system being operated by a tax service provider and comprising:

a server associated with a tax service provider connected to a network for transmitting and receiving client data, respectively, to and from client computer-based systems;

a web-based accounting software application running on the server;

means for automatically generating, by the server associated with the tax service provider, a preliminary tax document in a first format being substantially in a fileable format, and including means for automatically generating an element incorporated in the preliminary tax document and adapted to deter filing the preliminary tax document with a tax authority;

means for transmitting, by the server associated with the tax service provider, the preliminary tax document incorporating the element for delivery to a recipient client computer-based system associated with a client via web-based communication;

means for receiving, by the server associated with the tax service provider, an approval message from the client, the approval message indicating that the preliminary tax document is approved for filing;

means for automatically generating, by the server associated with the tax service provider, an invoice related to the preliminary tax document in response to the received approval message;

means for automatically generating, by the server associated with the tax service provider, a notification for the invoice for payment by automatically generating an email to an address associated with the client, wherein the email comprises one or more of an invoice document, an embedded link to access an invoice document, and an embedded link to a web page to facilitate payment;

means for determining, by the server associated with the tax service provider, payment has been made based on receipt of an electronic communication associated with the service of preparing a tax return from a payment processing entity and automatically storing in a transaction record payment confirmation data related to the payment;

means for automatically generating, by the server associated with the tax service provider, a final version of the preliminary tax document in response to determining payment has been made, wherein the final version of the preliminary tax document is the preliminary tax document in a second format excluding the element included in the first format, the element having been automatically removed by the server in response to determining payment has been made, and being in a condition for filing with a tax authority; and means for transmitting, by the server associated with the tax service provider, the final tax document for delivery to a tax authority.

25. The system of claim 24 further comprising a secure service provider Internet-based portal from which a client accesses the server using a secure sign-on process.

26. The system of claim 25, wherein the server is provided by a professional resources entity having a relationship with the service provider and wherein the server presents a user interface including indicia of the service provider, the client being a client of the service provider.

27. The system of claim 26, wherein the server is adapted to establish an electrical communication with a server operated by a tax authority to effect filing of the final tax document and is adapted to receive a confirmation of the filing of the final tax document.

28. The web-based accounting software application of claim 1, wherein the preliminary tax document is electronically stored locally in the computer-based system operated by the tax service provider, and wherein the user is provided access to a read-only version of the preliminary tax document through a web portal generated by the web-based accounting software application.

* * * * *